United States Patent
Jang et al.

(10) Patent No.: US 10,826,400 B1
(45) Date of Patent: Nov. 3, 2020

(54) CIRCUIT AND METHOD FOR CONTROLLING POWER CONVERTER BASED ON FEEDBACK CURRENT

(71) Applicant: SEMICONDUCTOR COMPONENTS INDUSTRIES, LLC, Phoenix, AZ (US)

(72) Inventors: Jihoon Jang, Incheon (KR); Jintae Kim, Seongnam-si (KR); JooHoon Kim, Bucheon (KR); Wontae Lee, Cheonan-Si (KR); KyungOun Jang, Bucheon-si (KR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/669,994

(22) Filed: Oct. 31, 2019

Related U.S. Application Data

(60) Provisional application No. 62/898,109, filed on Sep. 10, 2019.

(51) Int. Cl.
*H02M 3/335* (2006.01)
*H02M 1/08* (2006.01)
*H02M 1/00* (2006.01)

(52) U.S. Cl.
CPC ......... *H02M 3/33515* (2013.01); *H02M 1/08* (2013.01); *H02M 3/33523* (2013.01); *H02M 2001/0009* (2013.01)

(58) Field of Classification Search
CPC ......... H02M 3/33515; H02M 3/33523; H02M 1/08; H02M 1/088; H02M 2001/0009; H02M 2001/00
See application file for complete search history.

(56) References Cited

U.S. PATENT DOCUMENTS

| | | | |
|---|---|---|---|
| 6,469,914 B1 | 10/2002 | Hwang et al. | |
| 2003/0174005 A1 | 9/2003 | Latham, II et al. | |
| 2014/0132179 A1* | 5/2014 | McAuliffe | H02M 3/33507 315/291 |
| 2018/0184493 A1* | 6/2018 | Gritti | H02M 1/4258 |
| 2019/0296651 A1* | 9/2019 | Tang | H02M 1/08 |

OTHER PUBLICATIONS

Fairchild Semiconductor, "FSD176MRT Green-Mode Fairchild Power Switch (FPSTM)," Sep. 2011.

* cited by examiner

*Primary Examiner* — Emily P Pham
(74) *Attorney, Agent, or Firm* — AMPACC Law Group, PLLC

(57) ABSTRACT

A controller includes a feedback sensing circuit that generates a feedback current during a first time interval in a switching period of a power converter based on an output voltage of the power converter and to generate a digital sensing signal indicative of a duration of the first time interval, and a feedback signal generator that determines a magnitude of the feedback current that flows during the first time interval based on a value of the digital sensing signal and to generate a digital feedback signal based on the determined magnitude of the feedback current. The controller adjusts the output voltage of the power converter in response to the digital feedback signal.

20 Claims, 6 Drawing Sheets

CIRCUIT AND METHOD FOR CONTROLLING POWER CONVERTER BASED ON FEEDBACK CURRENT

CROSS-REFERENCE TO RELATED APPLICATIONS

This application claims the benefit of U.S. Provisional Patent Application No. 62/898,109, filed on Sep. 10, 2019, the entire contents of which is incorporated herein by reference.

BACKGROUND

The present disclosure relates to a controller and a power converter including the controller, and a method for controlling the power converter.

A power converter converts an input voltage into an output voltage and provides the output voltage to a load. The power converter may perform a feedback operation using a feedback current to keep the output voltage at a predetermined level. For example, the power converter may include an opto-coupler, a feedback capacitor, and a controller. The opto-coupler may receive an electrical signal indicating the output voltage, convert the electrical signal into light, and cause a feedback current to flow therethrough in response to the converted light. The feedback capacitor is coupled to the opto-coupler in parallel and adjusts a level of a feedback voltage at an end of the feedback capacitor in response to the feedback current. The controller adjusts a duty cycle of a power switch using the feedback voltage to keep the output voltage at the predetermined level.

In such a conventional power converter, the feedback current continuously flows during the entire switching period of the power switch, thereby consuming a relatively large amount of power. In addition, the feedback capacitor is disposed outside the controller and has a relatively large capacitance value, thereby occupying a relatively large circuit area.

SUMMARY

Embodiments of the present application relate to a controller and a power converter including the controller, and a method for controlling the power converter.

In an embodiment, a controller includes a feedback sensing circuit configured to generate a feedback current during a first time interval in a switching period of a power converter based on an output voltage of the power converter and to generate a digital sensing signal indicative of a duration of the first time interval, and a feedback signal generator configured to determine a magnitude of the feedback current that flows during the first time interval based on a value of the digital sensing signal and to generate a digital feedback signal based on the determined magnitude of the feedback current. The controller adjusts the output voltage of the power converter in response to the digital feedback signal.

In an embodiment, a power converter includes a first side including a controller and a second side including an output capacitor configured to provide an output voltage. The controller includes a feedback sensing circuit configured to generate a feedback current during a time interval in a switching period based on the output voltage and to generate a digital sensing signal indicative of a duration of the time interval and a feedback signal generator configured to determine a magnitude of the feedback current that flows during the time interval based on a value of the digital sensing signal and to generate a digital feedback signal based on the determined magnitude of the feedback current. The controller adjusts the output voltage of the power converter in response to the digital feedback signal.

In an embodiment, a method for controlling a power converter includes generating a feedback current during a time interval in a switching period based on an output voltage of the power converter, generating a digital sensing signal indicative of a duration of the time interval, determining a magnitude of the feedback current that flows during the time interval based on a value of the digital sensing signal, generating a digital feedback signal based on the determined magnitude of the feedback current, and adjusting the output voltage of the power converter in response to the digital feedback signal.

DETAILED DESCRIPTION

Embodiments of the present application relate to a controller for controlling a power converter, a power converter including the controller, and a method of controlling the power converter.

In an embodiment, the controller controls a feedback current to flow during a time interval in a switching period, rather than throughout the entire switching period. For example, the time interval is in a range from 5% to 45% of the switching period. As a result, a power converter including the controller according to an embodiment of the present disclosure reduces power consumption compared to that of a conventional power converter in which a feedback current continues to flow throughout the entire switching period.

In an embodiment, the PWM controller includes one or more capacitors each having a relatively small capacitance value and a relatively small size. As a result, a power converter including the PWM controller according to an embodiment of the present disclosure reduces a circuit area compared to that of a conventional power converter including a feedback capacitor that is disposed outside a controller and has a relatively large capacitance value.

A detailed description of embodiments is provided below along with accompanying figures. The scope of this disclosure is limited only by the claims and encompasses numerous alternatives, modifications and equivalents. Although steps of various processes are presented in a given order, embodiments are not necessarily limited to being performed in the listed order. In some embodiments, certain operations may be performed simultaneously, in an order other than the described order, or not performed at all.

Numerous specific details are set forth in the following description. These details are provided to promote a thorough understanding of the scope of this disclosure by way of specific examples, and embodiments may be practiced according to the claims without some of these specific details. Accordingly, the specific embodiments of this disclosure are illustrative, and are not intended to be exclusive or limiting. For the purpose of clarity, technical material that is known in the technical fields related to this disclosure has not been described in detail so that the disclosure is not unnecessarily obscured.

Figure 1:
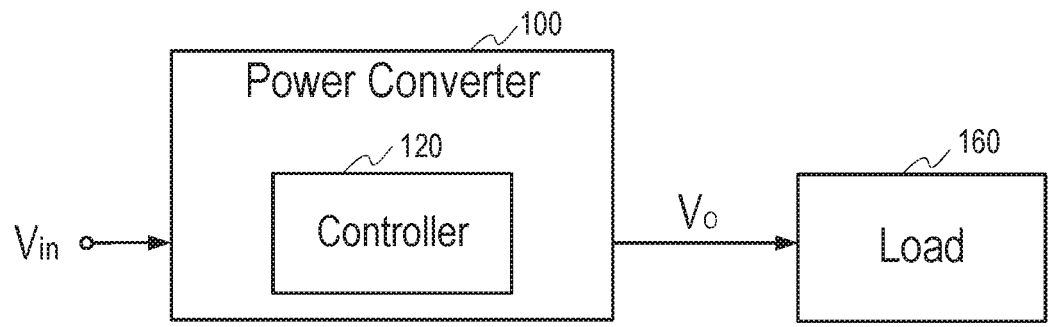
FIG. 1 illustrates a power converter according to an embodiment of the present disclosure.

FIG. 1 illustrates a power converter 100 according to an embodiment of the present disclosure. The power converter 100 receives an input signal (e.g., an input voltage) $V_{in}$ and provides an output signal (e.g., an output voltage) $V_o$ to a load 160.

The power converter 100 may adjust a level of the output voltage $V_o$ using a feedback control based on information on the output voltage $V_o$. For example, the power converter 100 may be any one of a forward converter, a power factor correction (PFC) converter, or a flyback converter.

The power converter 100 may be controlled by a controller 120. In an embodiment, the controller 120 controls a feedback current to flow during a time interval in a switching period of the power converter 100 based on the output voltage $V_o$, rather than throughout the entire switching period. As a result, the power converter 100 including the controller 120 reduces power consumption compared to that of a conventional power converter in which a feedback current continues to flow throughout the entire switching period.

The PWM controller 120 may be integrated in one or more semiconductor chips. These semiconductor chips may be packaged by themselves or together with one or more other semiconductor chips.

The load 160 may include one or more integrated chips (ICs). In an embodiment, the output voltage $V_o$ is used to supply power to one or more of a Central Processing Unit (CPU), a Graphics Processing Unit (GPU), an integrated memory circuit, a battery charger, a light emitting diode (LED), or generally any type of electrical load.

Figure 2:
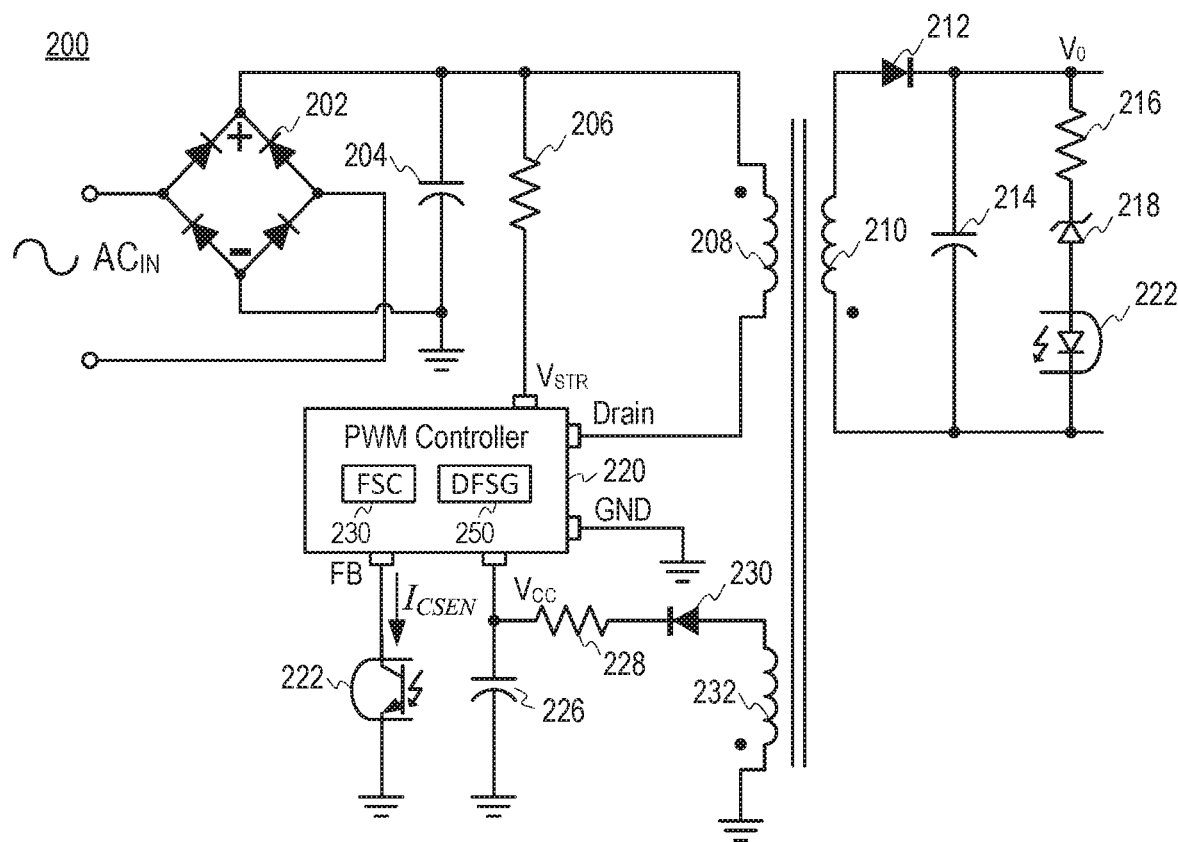
FIG. 2 illustrates a flyback converter according to an embodiment of the present disclosure.

FIG. 2 illustrates a power converter (e.g., a flyback converter) 200 according to an embodiment of the present disclosure. The flyback converter 200 in FIG. 2 receives an input signal (e.g., input voltage) $AC_{IN}$, and provides an output signal (e.g., output voltage) $V_o$ to a load (e.g., the load 160 in FIG. 1).

A primary side of the flyback converter 200 includes a PWM controller 220, a rectifier 202, a first capacitor 204, a first resistor 206, and a primary coil 208, an auxiliary coil 232, a first diode 230, a second resistor 228, a second capacitor 226, and a first portion of an opto-coupler 222.

The PWM controller 220 includes a switch device (e.g., a switch device 342 in FIG. 3) and generates a drive signal (e.g., a drive signal DR in FIG. 3) to turn on or off the switch device. For example, during a first portion (e.g., an on-time duration) of a cycle of the drive signal, the PWM controller 220 turns on the switch device. This causes energy to be supplied from the input voltage $AC_{IN}$ to the primary coil 208, where it is stored as a magnetic flux.

The PWM controller 220 further includes a feedback sensing circuit (FSC) 230 and a digital feedback signal generator (DFSG) 250. The FSC 230 generates a feedback current $I_{CSEN}$ that flows during a time interval in a switching period of the flyback converter 200, and generates a digital sensing signal (e.g., a digital sensing signal Dot in FIG. 3) indicative of a duration of the time interval. The DFSG 250 determines a magnitude of the feedback current $I_{CSEN}$ that flows during the time interval based on a value of the digital sensing signal, and generates a digital feedback signal (e.g., a digital feedback signal $D_{FB}$ in FIG. 3) based on the determined magnitude of the feedback current $I_{CSEN}$.

During the remaining portion (e.g., an off-time duration) of the cycle of the drive signal, the PWM controller 220 turns off the switch device. In response, the energy stored in the primary coil 208 is transferred into the secondary coil 210, causing a current to flow in the secondary coil 210 and a voltage to develop across end terminals of the secondary coil 210.

In the embodiment shown in FIG. 2, the PWM controller 220 includes the switch device, but embodiments of the present disclosure are not limited thereto. For example, the switch device may be disposed outside the PWM controller 220.

The second capacitor 226 has a first end coupled to a first node (or a first pin) Vcc and a second end coupled to a ground. When the flyback converter 200 performs a normal switching operation, the auxiliary winding 232, the first diode 230, and the second resistor 228 provide power to charge the second capacitor 226.

A secondary side of the flyback converter 200 includes a secondary coil 210, a second diode 212, an output capacitor 214, a third resistor 216, a Zener diode 218, and a second portion of the opto-coupler 222.

The second portion of the opto-coupler 222 receives an electrical signal (e.g., a current) indicative of the output voltage $V_o$ of the flyback converter 200 and converts the received electrical signal into light. For example, the second portion of the opto-coupler 222 includes a light-emitting diode (LED).

The first portion of the opto-coupler 222, which is included in the primary side of the flyback converter 200, detects the converted light and modulates the feedback current $I_{CSEN}$ in response to the detected light. The feedback current $I_{CSEN}$ may flow from a second node (e.g., a second pin) FB to a ground during a given time interval in a switching period of the flyback converter 200, rather than throughout the entire switching period. For example, the switching period of the flyback converter 200 may be a period of a control signal (e.g., the drive signal DR in FIG. 3) to turn on or off the switch device (e.g., a switch device 342 in FIG. 3). In an embodiment, the period of the control signal is substantially equal to a period of a clock signal (e.g., a clock signal CLK in FIG. 3), or a period (e.g., a switching period $T_s$ in FIG. 5) of each of a plurality of switching signals (e.g., second and fourth switching signals S2 and S4 in FIG. 5), or both.

In the embodiment shown in FIG. 2, the flyback converter 200 uses the opto-coupler 222 that modulates the feedback current $I_{CSEN}$ in response to the electrical signal indicative of the output voltage $V_o$ generated from the secondary side. However, embodiments of the present disclosure are not limited thereto, and embodiments of the present disclosure include various power converters (e.g., a forward converter and a PFC converter) each using a feedback control based on information on an output voltage thereof.

Figure 3:
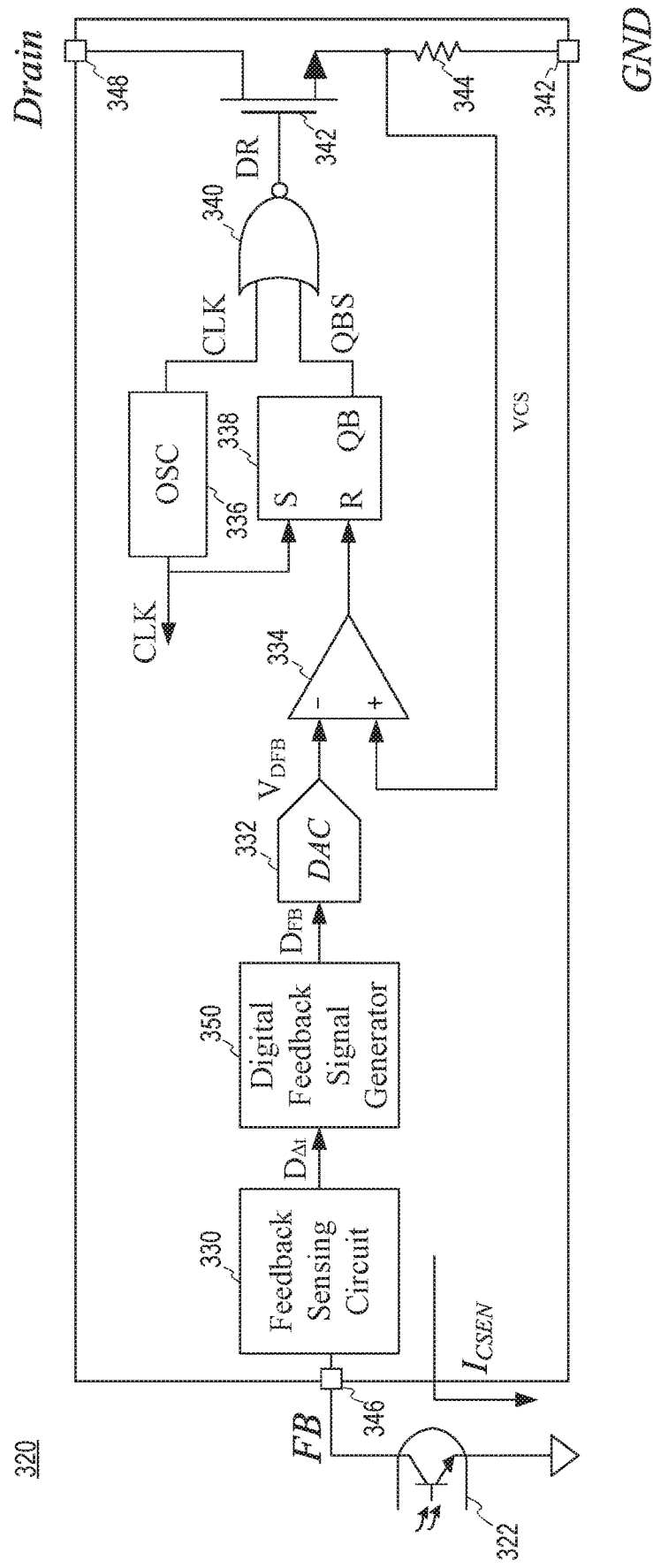
FIG. 3 illustrates a controller according to an embodiment of the present disclosure.

FIG. 3 illustrates a controller (e.g., a PWM controller) 320 according to an embodiment of the present disclosure. In FIG. 3, the PWM controller 320 includes a feedback sensing circuit 330, a digital feedback signal generator 350, a digital-to-analog converter (DAC) 332, a comparator 334, an oscillator (OSC) 336, a flip-flop 338, a logic gate 340, a switch device 342, a sensing resistor 344.

The feedback sensing circuit 330 is coupled to a first node (e.g., a feedback pin) 346 and generates a digital sensing signal $D_{At}$ indicating a specific time interval. In an embodiment, the feedback sensing circuit 330 includes a first capacitor (e.g., a first capacitor 406 in FIG. 4) and a second capacitor (e.g., a second capacitor 408 in FIG. 4), and the digital sensing signal $D_{At}$ indicates a time interval during which the first capacitor is discharged by a feedback current $I_{CSEN}$ and the second capacitor is charged by a reference current (e.g., a reference current $I_{REF}$ in FIG. 4). During the time interval in a switching period, the feedback current $I_{CSEN}$ flows from the feedback sensing circuit 330 to a ground through the feedback pin 346 and an opto-coupler 322. During the remaining time interval of the switching period, the feedback current $I_{CSEN}$ is substantially prevented from flowing from the feedback sensing circuit 330.

The digital feedback signal generator 350 generates a digital feedback signal $D_{FB}$ in response to the digital sensing signal $D_{At}$. The digital feedback signal $D_{FB}$ is used to keep a level of an output voltage of a power converter at a predetermined level. In an embodiment, the digital feedback signal generator 350 determines a magnitude of the feedback current $I_{CSEN}$ during a time interval in a switching period based on the digital sensing signal $D_{At}$ indicative of the time interval, and generates the feedback signal $D_{FB}$ based on the determined magnitude of the feedback current $I_{CSEN}$. For example, the time interval is in a range from 5% to 45% of the switching period. The digital feedback signal $D_{FB}$ is converted into an analog feedback signal (e.g. a feedback voltage) $V_{DFB}$ that is used to keep a level of an output voltage (e.g., the output voltage $V_o$ in FIG. 2) of a power converter at a predetermined level. For example, when the output voltage of the power converter is greater than the predetermined level, a magnitude of the feedback current $I_{CSEN}$ during the interval in the switching period may become greater than a predetermined magnitude (e.g., about 100 µA), thereby decreasing a value of the digital sensing signal $D_{At}$ indicative of the time interval during which the first capacitor is discharged by the feedback current $I_{CSEN}$. In response to the decreased value of the digital sensing signal $D_{At}$, the digital feedback signal generator 350 decreases a value of the digital feedback signal $D_{FB}$. As a result, a value of the feedback voltage $V_{DFB}$ is decreased to reduce an on-time duration of a power switch, thereby reducing the output voltage.

The DAC 332 converts the digital feedback signal $D_{FB}$ to an analog feedback signal (e.g. a feedback voltage) $V_{DFB}$. The DAC 332 provides the feedback voltage $V_{DFB}$ to the comparator 334.

In an embodiment, a combination of the opto-coupler 322, the feedback sensing circuit 330, the digital feedback signal generator 350, and the DAC 332 may be equivalent to an analog circuit (hereinafter, referred to as "a virtual analog circuit") including the opto-coupler 322, a current source, and a capacitor. For example, the current source generates a virtual feedback current (e.g., a digital feedback current $I_{DFB}$ in FIG. 6), and the capacitor having a virtual capacitance value (e.g., a digital capacitance value $C_{DFB}$ in FIG. 6) is coupled to the opto-coupler 322 in parallel, thereby generating the feedback voltage $V_{DFB}$ at an end of the capacitor in response to the feedback current $I_{CSEN}$.

In an embodiment, the PWM controller 320 generates the digital feedback signal $D_{FB}$ based on the magnitude of the feedback current $I_{CSEN}$ that flows during the interval in the switching period, and generates the feedback voltage $V_{DFB}$ in response to the digital feedback signal $D_{FB}$. For example, the DAC 332 decreases the feedback voltage $V_{DFB}$ in response to the decreased value of the digital feedback signal $D_{FB}$, such that the decreased amount of the feedback voltage $V_{DFB}$ results from discharging of the capacitor in the virtual analog circuit having the digital capacitance value $C_{DFB}$ in FIG. 6 by a current during the entire switching period. The current has a magnitude that is obtained by subtracting a magnitude (e.g., about 100 µA) of the digital feedback current $I_{DFB}$ in FIG. 6 from the magnitude of the feedback current $I_{CSEN}$. Because the PWM controller 320 controls the feedback current $I_{CSEN}$ to flow during the time interval in the switching period, rather than throughout the entire switching period, for determining the digital feedback signal $D_{FB}$, a power converter including the PWM controller 320 reduces power consumption compared to that of a conventional power converter in which a feedback current continues to flow throughout the entire switching period.

The comparator 334 has an inverting input receiving the feedback voltage $V_{DFB}$ and a non-inverting input receiving a sensing voltage $v_{cs}$. The comparator 334 asserts its output signal when the sensing voltage $v_{cs}$ becomes equal to or greater than the feedback voltage $V_{DFB}$, and de-asserts the output signal otherwise.

The flip-flop (e.g., an RS flip-flop) 338 receives a clock signal CLK from the OSC 336 as a set signal and the output signal from the comparator 334 as a reset signal. The RS flip-flop 338 generates an output signal QBS having a logic high value when the reset signal has a logic high value, and generates the output signal QBS having a logic low value when the set signal has a logic high value.

The logic gate (e.g., a NOR gate) 340 receives the clock signal CLK from the OSC 336 and the output signal QBS from the RS flip-flop 338. In an embodiment, the NOR gate 340 performs a logical NOR operation on the clock signal CLK and the output signal QBS, and outputs a drive signal DR indicating the logical operation result to the switch device 342.

The switch device 342 is coupled between a second node (e.g., a drain pin) 348 and the sensing resistor 344. In an embodiment, the switch device 342 includes a NMOS transistor having a drain coupled to the drain pin 348 and a source coupled to a first end of the sensing resistor 334.

The sensing resistor 334 further has a second end coupled to a third node (e.g., a ground pin) 342. The sensing voltage $v_{cs}$ is a voltage across the first and second ends of the sensing resistor 334.

Figure 4:
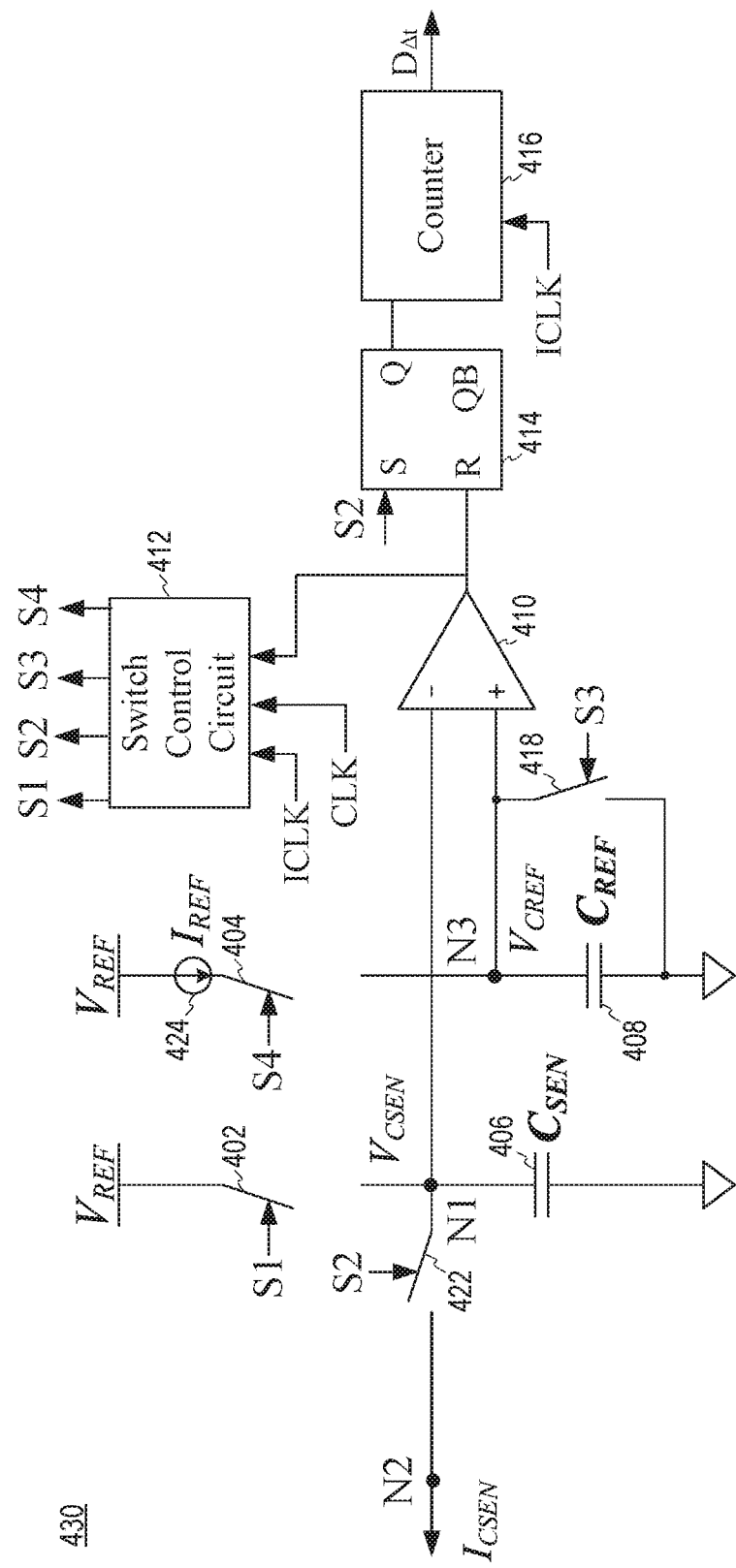
FIG. 4 illustrates a feedback sensing circuit according to an embodiment of the present disclosure.

FIG. 4 illustrates a feedback sensing circuit 430 suitable for use as the feedback sensing circuit 330 in FIG. 3 according to an embodiment of the present disclosure. The feedback sensing circuit 430 includes a first switch 402, a second switch 422, a third switch 418, a fourth switch 404, a first capacitor 406, a second capacitor 408, a current source 424, a switch control circuit 412, a comparator 410, a flip-flop 414, and a counter 416.

The first switch 402 couples a first reference voltage $V_{REF}$ to a first node N1 in response to a first switching signal S1. In an embodiment, the first switch 402 is turned on to couple the first reference voltage $V_{REF}$ to the first node N1 when the first switching signal S1 has a first value (e.g., a logic high value), and turned off to decouple the first reference voltage $V_{REF}$ from the first node N1 when the first switching signal S1 has a second value (e.g., a logic low value).

The second switch 422 couples the first node N1 to a second node N2 through which a feedback current $I_{CSEN}$ flows in response to a second switching signal S2. In an embodiment, the second switch 422 is turned on to couple the first node N1 to the second node N2 when the second switching signal S2 has a logic high value, and turned off to decouple the first node N1 from the second node N2 when the second switching signal S2 has a logic low value.

The third switch 418 couples a third node N3 to a ground in response to a third switching signal S3. In an embodiment, the third switch 418 is turned on to couple the third node N3 to the ground when the third switching signal S3 has a logic high value, and turned off to decouple the third node N3 from the ground when the third switching signal S3 has a logic low value.

The fourth switch 404 couples the current source 424 to the third node N3 in response to a fourth switching signal S4. In an embodiment, the fourth switch 404 is turned on to couple the current source 424 to the third node N3 when the fourth switching signal S4 has a logic high value, and turned off to decouple the current source 424 from the third node N3 when the fourth switching signal S4 has a logic low value.

The first capacitor 406 is coupled between the first node N1 and the ground, and has a capacitance value $C_{SEN}$. The second capacitor 408 is coupled between the third node N3 and the ground, and has a capacitance value $C_{REF}$. In an embodiment, each of the first capacitor 406 and the second capacitor 408 has a relatively small capacitance value (e.g., in a range from about 10 pF to about 20 pF) compared to that (e.g., tens of nF) of an external capacitor disposed outside a PWM controller of a conventional power converter. In addition, each of the first capacitor 406 and the second capacitor 408 is disposed within a PWM controller (e.g., the PWM controller 320 in FIG. 3), and thus has a relatively small size compared to that of the external capacitor of the conventional power converter.

The comparator 410 compares a feedback sensing signal (or feedback sensing voltage) $V_{CSEN}$ and a second reference signal (e.g., second reference voltage) $V_{CREF}$, and provides an output signal indicative of the comparison result to the switch control circuit 412 and the flip-flop 414. The comparator 410 has an inverting input coupled to the first node N1 and a non-inverting input coupled to the third node N3.

The switch control circuit 412 receives the output signal from the comparator 410, a clock signal CLK, an internal clock ICLK, and generates the first, second, third, and fourth switching signals S1, S2, S3, and S4 in response to the output signal, the clock signal CLK, and the internal clock ICLK. In an embodiment, the switch control circuit 412 generates the second and fourth switching signals S2 and S4 each having a logic high value and the first and third switching signals S1 and S3 each having a logic low value when the switch control circuit 412 detects a specific edge (e.g., a rising edge) of the clock signal CLK. The switch control circuit 412 keeps generating the second and fourth switching signals S2 and S4 each having a logic high value and the first and third switching signals S1 and S3 each having a logic low value until the comparator 410 asserts the output signal. The switch control circuit 412 generates the second and fourth switching signals S2 and S4 each having a logic low value and the first and third switching signals S1 and S3 each having a logic high value when the switch control circuit 412 receives the asserted output signal. The switch circuit 412 keeps generating the second and fourth switching signals S2 and S4 each having a logic low value and the first and third switching signals S1 and S3 each having a logic high value until the switch control circuit 412 detects the rising edge of the clock signal CLK again.

In an embodiment, the flop-flop 414 is an RS flip-flop that receives the second switching signal S2 as a set signal and the output signal from the comparator 410 as a reset signal. The RS flip-flop 414 generates an output signal Q having a logic high value when the second switching signal S2 has a logic high value, and generates the output signal Q having a logic low value when the output signal from the comparator 410 has a logic high value. In the embodiment shown in FIG. 4, the RS flop-flop 414 receives the second switching signal S2 as the set signal, but embodiments of the present disclosure are not limited thereto. For example, the RS flop-flop 414 may receive the fourth switching signal S4 as the set signal.

The counter 416 receives the output signal Q from the flip-flop 414 and generates a digital sensing signal $D_{\Delta t}$ indicating a magnitude of the feedback current $I_{CSEN}$ in response to the output signal Q. In an embodiment, the counter 416 counts at a predetermined rate when the output signal Q has a logic high value and is reset to zero when the output signal Q has a logic low value, thereby generating the digital sensing signal $D_{\Delta t}$ indicative of a time interval (e.g., a first time interval $\Delta t$ in FIG. 5) from a first time (e.g., a first time $t_1$ in FIG. 5) when the second switching signal S2 is asserted to a second time (e.g., a second time $t_2$ in FIG. 5) when the comparator 410 asserts the output signal.

An operation of the feedback sensing circuit 430 will be described below in more detail with reference to FIG. 5.

Figure 5:
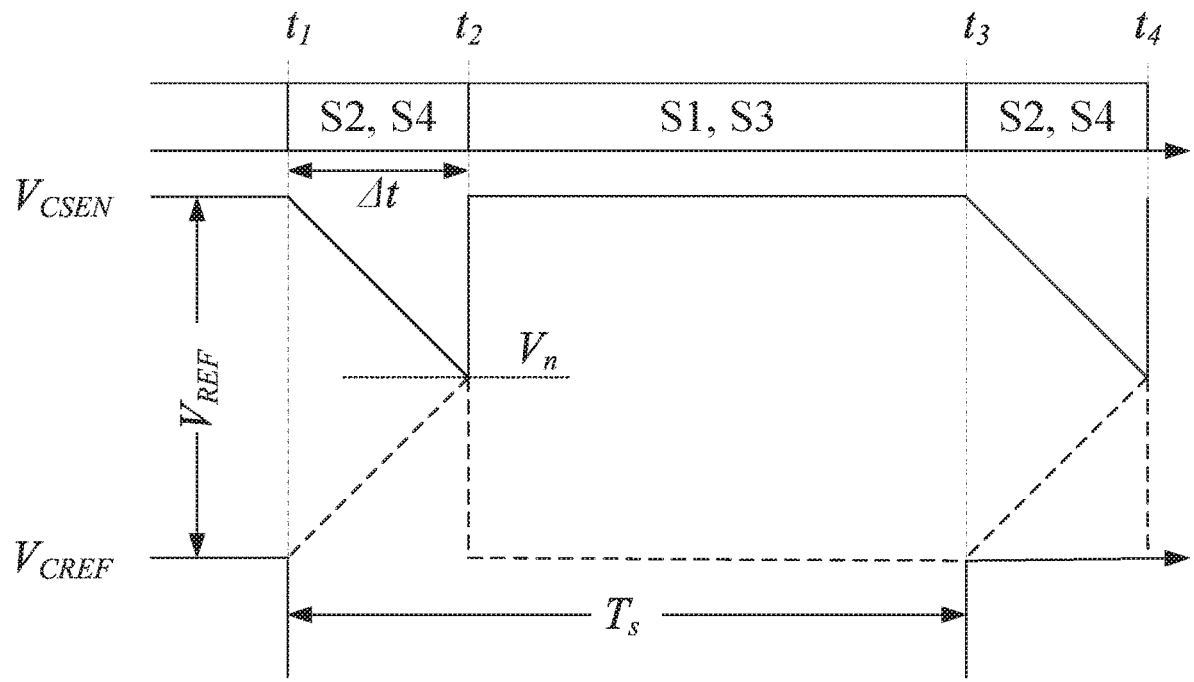
FIG. 5 illustrates an operation of the feedback sensing circuit in FIG. 4 according to an embodiment of the present disclosure.

Referring to FIGS. 4 and 5, at a first time $t_1$, the switch control circuit 412 asserts the second and fourth switching signals S2 and S4. The second switch 422 is turned on in response to the second switching signal S2 to discharge the first capacitor 406 by the feedback current $I_{CSEN}$, thereby decreasing a level of the feedback sensing voltage $V_{CSEN}$ from a level of a first given voltage (e.g., the first reference voltage $V_{REF}$). The fourth switch 404 is turned on in response to the fourth switching signal S4 to charge the second capacitor 408 by the reference current $I_{REF}$, thereby increasing a level of the second reference voltage $V_{CREF}$ from a level of a second given voltage (e.g., a zero voltage).

During a first time interval $\Delta t$ between the first time $t_1$ and a second time $t_2$, the flip-flop 414 generates the output signal Q having a logic high value in response to the second switching signal S2 having a logic high value, thereby increasing a value of the counter 416 in response to the internal clock signal ICLK.

At the second time $t_2$, the level of the second reference voltage $V_{CREF}$ becomes substantially equal to the level of the feedback sensing voltage $V_{CSEN}$. As a result, the comparator 410 asserts the output signal and provides the asserted output signal to the RS flip-flop 414 as a reset signal. The flip-flop 414 generates the output signal Q having a logic low value in response to the output signal of the comparator 410 having a logic high value, thereby stopping increasing the value of the counter 416 and outputting the digital sensing signal Dot indicative of the first time interval $\Delta t$.

In the embodiment shown in FIG. 5, the magnitude of the feedback current $I_{CSEN}$ is represented by the following equation:

$$I_{CSEN} = C_{SEN} * \frac{V_{REF} - V_n}{\Delta t}. \qquad \text{Equation 1}$$

In Equation 1, $V_n$ is a voltage of the feedback sensing voltage $V_{CSEN}$ at the second time $t_2$.

The magnitude of the reference current $I_{REF}$ is represented by the following equation:

$$I_{REF} = C_{REF} * \frac{-V_n}{\Delta t} \qquad \text{Equation 2}$$

In Equation 2, $V_n$ is a voltage of the second reference voltage $V_{CREF}$ at the second time $t_2$. In an embodiment, the magnitude of the reference current $I_{REF}$ may be determined based on the capacitance value $C_{REF}$ of the second capacitor 408, a maximum level (e.g., the first reference voltage $V_{REF}$ in FIG. 5) of the feedback sensing voltage $V_{CSEN}$, and a period of a clock signal (e.g., the clock signal CLK in FIG. 7), such that the second reference voltage $V_{CREF}$ can reach the first reference voltage $V_{REF}$ within the period of the clock signal. For example, the magnitude of the reference current $I_{REF}$ is greater than 5 µA when the capacitance value $C_{REF}$ is 10 pF, the first reference voltage $V_{REF}$ is 5V, and the period of the clock signal is 10 µs. The magnitude of the reference current $I_{REF}$ may be relatively small compared to that (e.g., 100 µA or greater) of a feedback current flowing through an opto-coupler in a conventional power converter.

In an embodiment, the capacitance value $C_{SEN}$ of the first capacitor 406 may be substantially the same as the capacitance value $C_{REF}$ of the second capacitor 408. In such an embodiment, the magnitude of the feedback current $I_{CSEN}$ in Equation 1 can be rewritten into the following equation using Equation 2:

$$I_{CSEN} = \frac{k}{\Delta t} + I_{REF} \qquad \text{Equation 3}$$

In Equation 3, k is a given constant that can be represented by $C_{SEN}*C_{REF}$. As indicated in Equation 3, the magnitude of the feedback current $I_{CSEN}$ may vary with the first time interval $\Delta t$. For example, when the magnitude of the feedback current $I_{CSEN}$ increases the first time interval $\Delta t$ decreases, and vice versa.

During a second time interval between the second time $t_2$ and a third time $t_3$, the switch control circuit 412 generates the second and fourth switching signals S2 and S4 each having a logic low value and the first and third switching signals S1 and S3 each having a logic high value. The first switch S1 is turned on in response to the first switching signal S1 to couple the first node N1 to the first reference voltage $V_{REF}$, thereby keeping the level of the feedback sensing voltage $V_{CSEN}$ substantially equal to that of the first reference voltage $V_{REF}$. The third switch S3 is turned on in response to the third switching signal S3 to couple the third node N3 to the ground, thereby keeping the level of the second reference voltage $V_{CREF}$ substantially equal to the zero voltage.

During a third time interval between the third time $t_3$ and a fourth time $t_4$, operations of the feedback sensing circuit 430 are similar to those described above during the first time interval $\Delta t$. Therefore, detailed descriptions on the operation of the feedback sensing circuit 430 during the third time interval are omitted herein for the interest of brevity.

Figure 6:
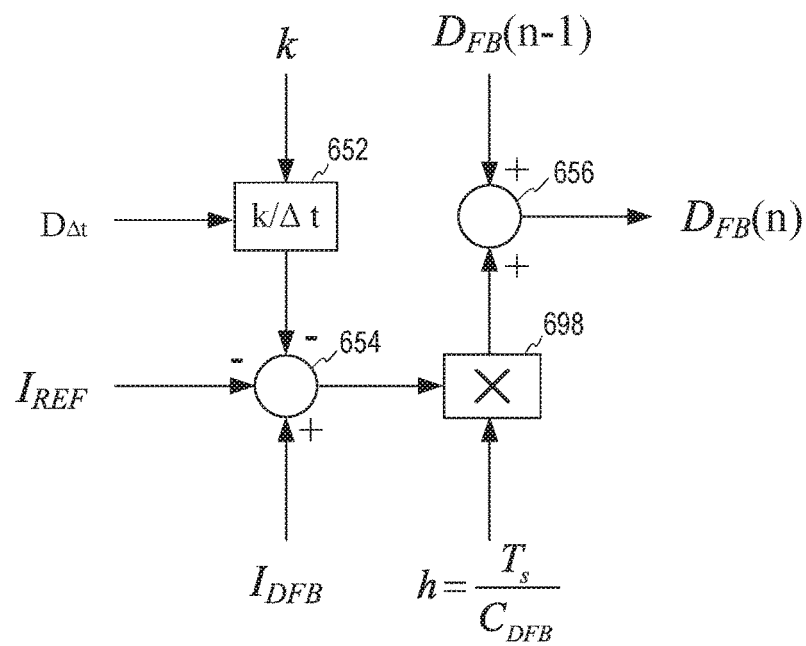
FIG. 6 illustrates a digital feedback signal generator according to an embodiment of the present disclosure.

FIG. 6 illustrates a digital feedback signal generator 650 according to an embodiment of the present disclosure. The digital feedback signal generator 650 includes a divider 652, a subtractor 654, a multiplier 698, and an adder 656.

The divider 652 divides a first constant k (e.g., the constant k in Equation 3) by a value of a digital sensing signal $D_{\Delta t}$ (e.g., the digital sensing signal $D_{\Delta t}$ in FIG. 4), and provides an output signal indicating the divided value to the subtractor 654. In an embodiment, the first constant k is a multiplication results of a capacitance value of a first capacitor (e.g., the first capacitor 406 in FIG. 4) and a capacitance value of a second capacitor (e.g., the second capacitor 408 in FIG. 4), and the digital sensing signal $D_{\Delta t}$ indicates a time interval (e.g. the first time interval $\Delta t$ in FIG. 5) during which the first capacitor is discharged and the second capacitor is charged.

The subtractor 654 subtracts the divided value and a magnitude of a reference current $I_{REF}$ (e.g., the reference current $I_{REF}$ in FIG. 4) from a magnitude of a digital feedback current $I_{DFB}$, and provides the subtracted value to the multiplier 698. For example, the magnitude of the digital feedback current $I_{DFB}$ may be equal to that (e.g., about 100 µA) of a feedback current in a conventional power converter to keep a level of a feedback voltage constant when the conventional power converter generates an output voltage having a predetermined level.

The multiplier 698 multiplies the subtracted value and a second constant h, and provides the multiplied value to the adder 656. The second constant h may be obtained by dividing a switching period Ts (e.g., the switching period of $T_s$ in FIG. 5) of each of a plurality of switching signals (e.g., the first, second, third, and fourth switching signals S1, S2, S3, and S4 in FIG. 5) by a digital capacitance value $C_{DFB}$. For example, the digital capacitance value $C_{DFB}$ may be equal to a capacitance value (e.g., tens of nF) of a feedback capacitor in a conventional power converter, the feedback capacitor having a first end coupled to an opto-coupler and a current source that generates a feedback current and a second end coupled to a ground.

The adder 656 adds the multiplied value to a previous value $D_{FB}(n-1)$ of a digital feedback signal (e.g., the digital feedback signal $D_{FB}$ in FIG. 3), and generates a current value $D_{FB}(n)$ of the digital feedback signal. In the embodiment shown in FIG. 6, the current value $D_{FB}(n)$ of the digital feedback signal is represented by the following equation:

$$D_{FB}(n) = \frac{T_s}{C_{DFB}}\left\{I_{DFB} - \left(\frac{k}{\Delta t} + I_{REF}\right)\right\} + D_{FB}(n-1). \qquad \text{Equation 4}$$

Figure 7:
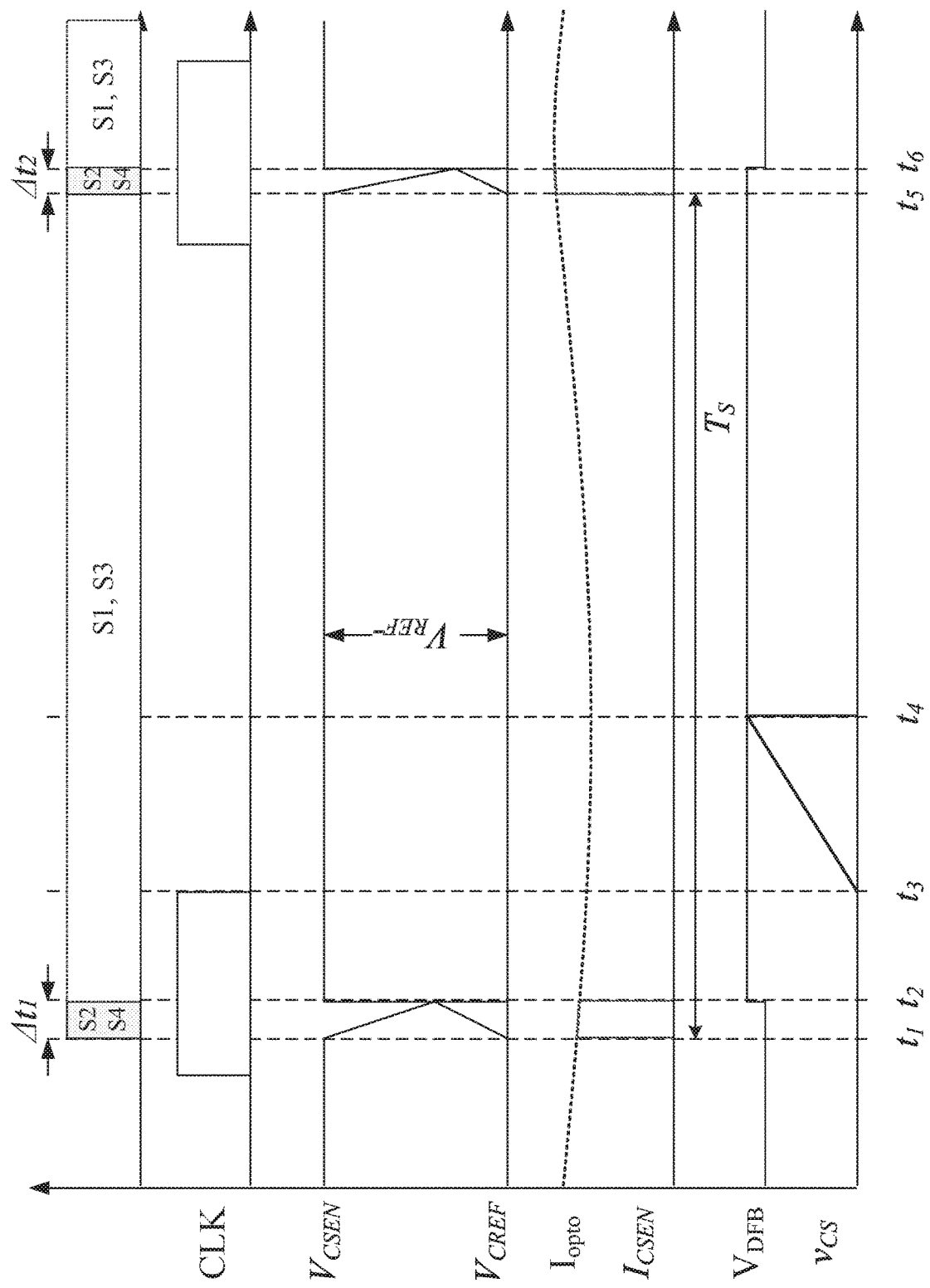
FIG. 7 illustrates an operation of the controller in FIG. 3 according to an embodiment of the present disclosure.

FIG. 7 illustrates an operation of a PWM controller (e.g., the PWM controller 320 in FIG. 3) in a power converter (e.g., the flyback converter 200 in FIG. 2) according to an embodiment of the present disclosure. The figure shows example waveforms of a clock signal CLK (e.g., the clock signal CLK in FIG. 3), a feedback sensing signal $V_{CSEN}$ (e.g., the feedback sensing voltage $V_{CSEN}$ in FIG. 4), a second reference voltage $V_{CREF}$ (e.g., the second reference voltage $V_{CREF}$ in FIG. 4), a virtual opto-coupler current $I_{opto}$, a feedback current $I_{CSEN}$ (e.g., the feedback current $I_{CSEN}$ in FIG. 4), a feedback signal $V_{DFB}$ (e.g., the feedback voltage $V_{DFB}$ in FIG. 3), and a sensing voltage $v_{cs}$ (e.g., the sensing voltage $v_{cs}$ in FIG. 3).

At a first time $t_1$, the switch control circuit 412 in FIG. 4 asserts the second and fourth switching signals S2 and S4 and de-asserts the first and third switching signals S1 and S3. The second switch 422 in FIG. 4 is turned on to discharge the first capacitor 406 by the feedback current $I_{CSEN}$, thereby decreasing a level of the feedback sensing voltage $V_{CSEN}$ from a level of the first reference voltage $V_{REF}$. The fourth switch 404 in FIG. 4 is turned on to charge the second capacitor 408 by the reference current $I_{REF}$, thereby increasing a level of the second reference voltage $V_{CREF}$ from a zero voltage.

During a first time interval $\Delta t_1$ from the first time $t_1$ and a second time $t_2$, the feedback current $I_{CSEN}$ has a magnitude that is equal to that of the virtual opto-coupler current $I_{opto}$. For example, the virtual opto-coupler current $I_{opto}$ indicates the feedback current $I_{CSEN}$ that would flow assuming that the feedback current $I_{CSEN}$ could continuously flow throughout the entire switching period T. In an embodiment, the first time interval $\Delta t_1$ is in a range of from 5% to 45% of the switching period T.

At a second time $t_2$, the level of the second reference voltage $V_{CREF}$ becomes substantially equal to the level of the feedback sensing voltage $V_{CSEN}$. As a result, the feedback sensing circuit 330 in FIG. 3 outputs the digital sensing signal Dot indicative of the first time interval $\Delta t_1$, and the digital feedback signal generator 350 in FIG. 3 outputs the digital feedback signal $D_{FB}$ to the DAC 332. The DAC 332 converts the digital feedback signal $D_{FB}$ to the analog feedback voltage $V_{DFB}$. In addition, the switch control circuit 412 in FIG. 4 de-asserts the second and fourth switching signals S2 and S4 and asserts the first and third switching signals S1 and S3. As a result, the first switch 402 in FIG. 4 is turned on to make the level of the feedback sensing voltage $V_{CSEN}$ substantially equal to that of the first reference voltage $V_{REF}$, and the third switch 418 is turned on to make the level of the second reference voltage $V_{CREF}$ substantially equal to the zero voltage.

At a third time t3, the oscillator 336 in FIG. 3 de-asserts the clocks signal CLK to turn on the switch device 342. As a result, a current flowing through the switch device 342 starts to increase, thereby increasing a level of the sensing voltage $v_{cs}$ from the third time $t_3$.

At a fourth time $t_4$, the comparator 334 in FIG. 3 asserts its output signal when the sensing voltage $v_{cs}$ reaches the feedback voltage $V_{DFB}$ to turn off the switch device 342. The switch control circuit 412 in FIG. 4 keeps the first switch 402 and the third switch 418 turned on from the second time $t_2$ to a fifth time $t_5$.

At the fifth time $t_5$, the switch control circuit 412 in FIG. 4 asserts the second and fourth switching signals S2 and S4 and de-asserts the first and third switching signals S1 and S3. As a result, the level of the feedback sensing voltage $V_{CSEN}$ is decreased from the level of the first reference voltage $V_{REF}$, and the level of the second reference voltage $V_{CREF}$ is increased from the zero voltage.

During a second time interval $\Delta t_2$ from the fifth time $t_5$ and a sixth time $t_6$, the feedback current $I_{CSEN}$ has the magnitude that is substantially equal to that of the virtual opto-coupler current $I_{opto}$. The magnitude of the feedback current $I_{CSEN}$ during the second time interval $\Delta t_2$ is greater than that of the feedback current $I_{CSEN}$ during the first time interval $\Delta t_1$, thereby making the second time interval $\Delta t_2$ shorter than the first time interval $\Delta t_1$.

At the sixth time $t_6$, the level of the second reference voltage $V_{CREF}$ becomes substantially equal to the level of the feedback sensing voltage $V_{CSEN}$. Because the second time interval $\Delta t_2$ is shorter than the first time interval $\Delta t_1$, the value of the digital feedback signal $D_{FB}$ in FIG. 3 is decreased at the sixth time $t_6$ compared to that of the digital feedback signal $D_{FB}$ at the second time $t_2$. As a result, the DAC 332 in FIG. 3 generates the feedback voltage $V_{DFB}$, which is decreased by a specific amount corresponding to the decreased value of the digital feedback signal $D_{FB}$ at the sixth time $t_6$. For example, the decreased amount of the feedback voltage $V_{DFB}$ may be a discharged amount from the capacitor in the virtual analog circuit having the digital capacitance value $C_{DFB}$ in FIG. 6 by a current during the switching period $T_s$, the current having a magnitude that is obtained by subtracting a magnitude (e.g., about 100 µA) of the digital feedback current $I_{DFB}$ in FIG. 6 from the magnitude of the feedback current $I_{CSEN}$. The decreased value of the feedback voltage $V_{DFB}$ makes an on-time duration (not shown) of the switch device 342 in a next switching cycle shorter than that between the third time $t_3$ and the fourth time $t_4$, thereby reducing an output voltage (e.g., the output voltage $V_o$ in FIG. 2) of the power converter as well as the magnitude of the feedback current $I_{CSEN}$ indicative of the output voltage. Although the embodiment shown in FIG. 7 controls the duty cycle of the power converter to adjust the output voltage, embodiments of the present disclosure are not limited thereto. For example, the power converter may control an operation frequency to adjust the output voltage.

As described above, a PWM controller according to an embodiment of the present disclosure causes a feedback current to flow during a time interval in a switching period, rather than throughout the entire switching period. As a result, a power converter including the PWM controller according to an embodiment of the present disclosure reduces power consumption compared to that of a conventional power converter in which a feedback current continues to flow throughout the entire switching period.

In an embodiment, the PWM controller includes one or more capacitors each having a relatively small capacitance value and a relatively small size. As a result, a power converter including the PWM controller according to an embodiment of the present disclosure reduces a circuit area compared to that of a conventional power converter including a feedback capacitor that is disposed outside a controller and has a relatively large capacitance value.

In an embodiment, the PWM controller generates a digital sensing signal having a value that indicates the time interval during which the feedback current flows. A value of the digital sensing signal may indicate information on a duty cycle of a switch device in a power converter, and the duty information may be used in various digital circuit elements, each of which performs one or more specific functions (e.g., limiting the duty cycle to a given maximum value, performing line compensation, and performing slope compensation).

Figure 8:
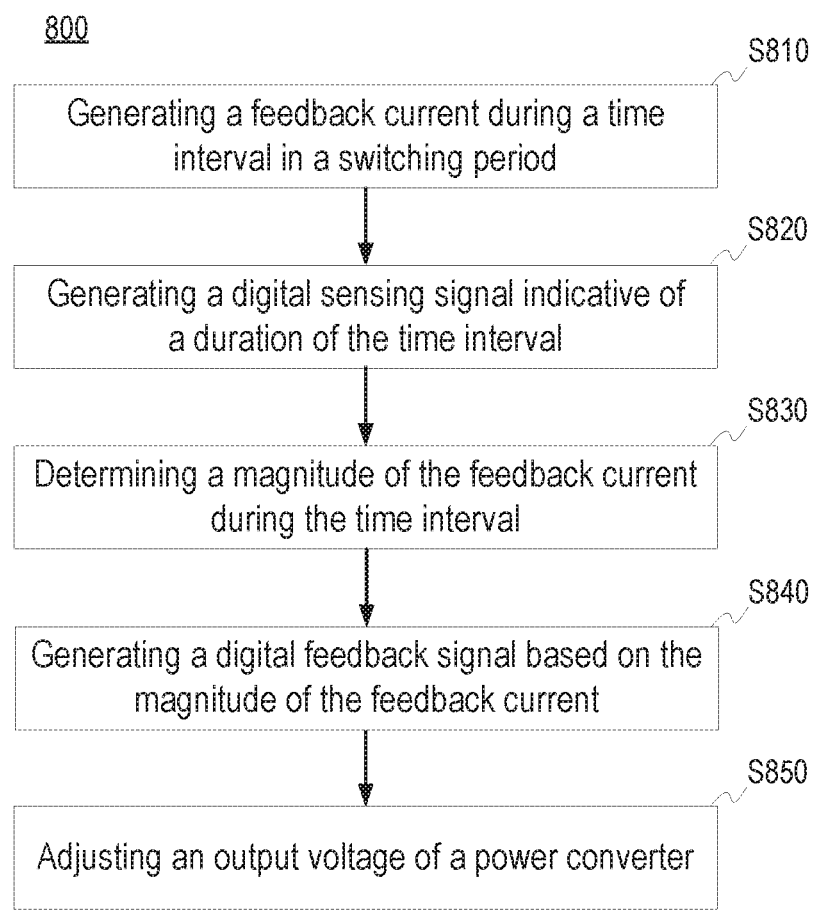
FIG. 8 illustrates a process performed by the controller in FIG. 3 according to an embodiment.

FIG. 8 illustrates a process 800 performed by a controller (e.g., the PWM controller 320 in FIG. 3) of a power converter (e.g., the flyback converter 200 in FIG. 2) according to an embodiment. In an embodiment, the PWM controller includes a feedback sensing circuit (e.g., the feedback sensing circuit 330 in FIG. 3), a feedback signal generator (e.g., the feedback signal generator 350 in FIG. 3), and a DAC (e.g., the DAC 332 in FIG. 3).

At S810, the feedback sensing circuit generates a feedback current (e.g., the feedback current $I_{CSEN}$ in FIG. 3) during a time interval (e.g., the first time interval AU in FIG. 7) in a switching period (e.g., the switching period of $T_s$ in FIG. 7) of the power converter based on an output voltage (e.g., the output voltage $V_o$ in FIG. 2). For example, the time interval is in a range from 5% to 45% of the switching period, thereby reducing power consumption compared to that of a conventional power converter in which a feedback current continues to flow throughout the entire switching period. In an embodiment, the feedback sensing circuit discharges a first capacitor (e.g., the first capacitor 406 in FIG. 4) to generate the feedback current.

At S820, the feedback sensing circuit generates a digital sensing signal (e.g., the digital sensing signal Dot in FIG. 4) indicative of a duration of the time interval. In an embodiment, the digital sensing signal indicates the time interval that varies with a magnitude of the feedback current.

At S830, the feedback signal generator determines a magnitude of the feedback current that flows during the time interval based on a value of the digital sensing signal. In an embodiment, when the magnitude of the feedback current $I_{CSEN}$ increases the first time interval $\Delta t$ decreases, and vice versa.

At S840, the feedback signal generator generates a digital feedback signal (e.g., the digital feedback signal $D_{FB}$ in FIG. 3) based on the determined magnitude of the feedback current. In an embodiment, the feedback signal generator decreases a value of the digital feedback signal when the magnitude of the feedback current increases.

At 850, the PWM controller adjusts the output voltage of the power converter in response to the digital feedback signal. In an embodiment, the power converter controls a duty cycle, an operation frequency, or both to adjust the output voltage thereof. For example, the DAC of the PWM controller generates a feedback voltage, which is decreased by a specific amount corresponding to the decreased value of the digital feedback signal. When an output voltage (e.g., the output voltage $V_o$ in FIG. 2) of the power converter becomes greater than a predetermined level, the value of the feedback voltage is decreased. The decreased value of the feedback voltage makes an on-time duration of a switch device (e.g., the switch device 342 in FIG. 3) shorter than an immediately preceding on-time duration (e.g., the time interval between the third time $t_3$ and the fourth time $t_4$ in FIG. 7) to reduce a duty cycle of the switch device, thereby decreasing the output voltage of the power converter.

Aspects of the present disclosure have been described in conjunction with the specific embodiments thereof that are proposed as examples. Numerous alternatives, modifications, and variations to the embodiments as set forth herein may be made without departing from the scope of the claims set forth below. Accordingly, embodiments as set forth herein are intended to be illustrative and not limiting.

What is claimed is:

1. A controller, comprising:
   a feedback sensing circuit configured to generate a feedback current during a first time interval in a switching period of a power converter based on an output voltage of the power converter and to generate a digital sensing signal indicative of a duration of the first time interval; and
   a feedback signal generator configured to determine a magnitude of the feedback current that flows during the first time interval based on a value of the digital sensing signal and to generate a digital feedback signal based on the determined magnitude of the feedback current,
   wherein the controller adjusts the output voltage of the power converter in response to the digital feedback signal.

2. The controller of claim 1, wherein the first time interval is in a range from 5% to 45% of the switching period.

3. The controller of claim 1, wherein the first time interval varies with the magnitude of the feedback current.

4. The controller of claim 3, wherein the feedback sensing circuit includes:
   a first capacitor configured to adjust a level of a feedback sensing voltage using the feedback current during the first time interval; and
   a second capacitor configured to adjust a level of a first reference voltage using a reference current during the first time interval.

5. The controller of claim 4, further comprising:
   a current source configured to generate the reference current;
   a node thorough which the feedback current flows during the first time interval;
   a first switch configured to couple a first end of the first capacitor to the node in response to a first switching signal; and
   a second switch configured to couple a first end of the second capacitor to the current source in response to a second switching signal.

6. The controller of claim 5, further comprising:
   a third switch configured to couple the first end of the first capacitor to a second reference voltage in response to a third switching signal;
   a fourth switch configured to couple the first end of the second capacitor to a second end of the second capacitor in response to a fourth switching signal; and
   a switch control circuit configured to generate the first, second, third, and fourth switching signals in response to a comparison result of the level of the feedback sensing voltage and the level of the first reference voltage.

7. The controller of claim 6, wherein the switch control circuit generates the first and second switching signals each having a first logic value and the third and fourth switching signals each having a second logic value, during the first time interval of the switching period, and
   wherein the switching control circuit generates the first and second switching signals each having the second logic value and the third and fourth switching signals each having the first logic value, during a second time interval of the switching period.

8. The controller of claim 4, further comprising:
   a comparator configured to compare the level of the feedback sensing voltage and the level of the first reference voltage and generate an output signal indicating the comparison result; and
   a counter configured to generate the digital sensing signal in response to the output signal.

9. The controller of claim 4, wherein each of the first capacitor and the second capacitor has a capacitance value in a range from about 10 pF to about 20 pF.

10. The controller of claim 3, wherein the feedback signal generator decreases a value of the digital feedback signal when the value of the digital sensing signal decreases.

11. The controller of claim 10, wherein the feedback signal generator includes:
   a divider dividing a first constant by the value of the digital sensing signal;
   a subtractor subtracting the divided value and a magnitude of a reference current from a magnitude of a digital feedback current;
   a multiplier multiplying the subtracted value and a second constant; and
   an adder adding the multiplied value to a previous value of the digital feedback signal to generate a current value of the digital feedback signal.

12. The controller of claim 1, further comprising:
   a digital-to-analog converter configured to convert the digital feedback signal into a feedback voltage; and
   a comparator configured to compare the feedback voltage and a sensing voltage and generate an output signal indicating the comparison result to control an operation of a switch device, the switch device being coupled to a sensing resistor, the sensing voltage being a voltage across the sensing resistor.

13. A method for controlling a power converter, the method comprising:

generating a feedback current during a time interval in a switching period based on an output voltage of the power converter;

generating a digital sensing signal indicative of a duration of the time interval;

determining a magnitude of the feedback current that flows during the time interval based on a value of the digital sensing signal;

generating a digital feedback signal based on the determined magnitude of the feedback current; and adjusting the output voltage of the power converter in response to the digital feedback signal.

14. The method of claim 13, wherein the time interval is in a range from 5% to 45% of the switching period.

15. The method of claim 13, further comprising varying the time interval with the magnitude of the feedback current.

16. The method of claim 15, wherein generating the digital sensing signal includes:

adjusting a level of a feedback sensing voltage using the feedback current during the time interval; and adjusting a level of a reference voltage using a reference current during the time interval.

17. The method of claim 16, wherein generating the digital sensing signal further includes:

comparing the level of the feedback sensing voltage and the level of the reference voltage to generate an output signal indicative of the comparison result; and generating the digital sensing signal in response to the output signal.

18. A power converter, comprising:

a first side including a controller; and a second side including an output capacitor configured to provide an output voltage, wherein the controller comprises:

a feedback sensing circuit configured to generate a feedback current during a time interval in a switching period based on the output voltage and to generate a digital sensing signal indicative of a duration of the time interval; and a feedback signal generator configured to determine a magnitude of the feedback current that flows during the time interval based on a value of the digital sensing signal and to generate a digital feedback signal based on the determined magnitude of the feedback current, the controller adjusting the output voltage in response to the digital feedback signal.

19. The power converter of claim 18, further comprising an opto-coupler configured to convert an electric signal indicative of the output voltage into light and adjust the magnitude of the feedback current in response to the light.

20. The power converter of claim 18, wherein the time interval is in a range from 5% to 45% of the switching period.

* * * * *